United States Patent
Johnson (10) Patent No.: US 9,787,889 B2
(45) Date of Patent: Oct. 10, 2017

(54) DYNAMIC AUTO FOCUS ZONES FOR AUTO FOCUS PIXEL SYSTEMS

(71) Applicant: SEMICONDUCTOR COMPONENTS INDUSTRIES, LLC, Phoenix, AZ (US)

(72) Inventor: Richard Scott Johnson, Boise, ID (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 29 days.

(21) Appl. No.: 14/621,025

(22) Filed: Feb. 12, 2015

(65) Prior Publication Data

US 2016/0241772 A1   Aug. 18, 2016

(51) Int. Cl.
*H04N 5/232* (2006.01)
*H04N 5/369* (2011.01)

(52) U.S. Cl.
CPC ....... *H04N 5/23212* (2013.01); *H04N 5/3696* (2013.01)

(58) Field of Classification Search
None
See application file for complete search history.

(56) References Cited

U.S. PATENT DOCUMENTS

| | | | |
|---|---|---|---|
| 5,130,735 A * | 7/1992 | Kusaka | G02B 7/34 396/104 |
| 7,702,232 B2 | 4/2010 | Yost et al. | |
| 8,421,906 B2 | 4/2013 | Pollard | |
| 8,742,309 B2 | 6/2014 | Agranov et al. | |
| 2006/0062484 A1* | 3/2006 | Aas | H04N 5/23212 382/255 |
| 2008/0025716 A1* | 1/2008 | Yost | G02B 7/08 396/123 |
| 2009/0278966 A1* | 11/2009 | Kusaka | G02B 7/36 348/294 |
| 2011/0085785 A1* | 4/2011 | Ishii | G03B 13/00 396/104 |
| 2011/0298963 A1* | 12/2011 | Kato | H04N 5/3696 348/345 |
| 2012/0193515 A1* | 8/2012 | Agranov | G01S 3/782 250/208.1 |
| 2012/0194721 A1* | 8/2012 | Sakaida | H04N 5/23212 348/302 |

(Continued)

OTHER PUBLICATIONS

Keelan et al., U.S. Appl. No. 14/614,104, filed Feb. 4, 2015.

*Primary Examiner* — Roberto Velez
*Assistant Examiner* — Yih-Sien Kao
(74) *Attorney, Agent, or Firm* — Treyz Law Group, P.C.; Joseph F. Guihan (57) ABSTRACT

An image sensor may include an image pixel array with both image pixels to gather image data and phase detection pixels to gather phase information. The image sensor may dynamically group the phase detection pixels into focus zones. Based on the characteristics of the scene being imaged and the use settings of the image sensor, the image sensor may determine the size, shape, and number of focus zones to be grouped. One or more focus zones may then be used to gather phase information data. The focus zones may vary in size and shape across the pixel array. A scene with low illumination level may result in larger focus zones with more phase detection pixels to ensure reliable phase information data.

15 Claims, 7 Drawing Sheets

(56) References Cited

U.S. PATENT DOCUMENTS

2012/0212661 A1* 8/2012 Yamaguchi .............. G02B 7/38
                                                      348/346
2015/0181102 A1* 6/2015 Oda .................... H04N 5/2355
                                                      348/229.1

* cited by examiner

DYNAMIC AUTO FOCUS ZONES FOR AUTO FOCUS PIXEL SYSTEMS

BACKGROUND

This relates generally to imaging systems and, more particularly, to imaging systems with phase detection capabilities.

Modern electronic devices such as cellular telephones, cameras, and computers often use digital image sensors. Imager sensors (sometimes referred to as imagers) may be formed from a two-dimensional array of image sensing pixels. Each pixel receives incident photons (light) and converts the photons into electrical signals. Image sensors are sometimes designed to provide images to electronic devices using a Joint Photographic Experts Group (JPEG) format.

Some applications such as automatic focusing and three-dimensional (3D) imaging may require electronic devices to provide stereo and/or depth sensing capabilities. For example, to bring an object of interest into focus for an image capture, an electronic device may need to identify the distances between the electronic device and object of interest. To identify distances, conventional electronic devices use complex arrangements. Some arrangements require the use of multiple image sensors and camera lenses that capture images from various viewpoints. Other arrangements require the addition of lenticular arrays that focus incident light on sub-regions of a two-dimensional pixel array. Due to the addition of components such as additional image sensors or complex lens arrays, these arrangements lead to reduced spatial resolution, increased cost, and increased complexity.

Some electronic devices include both image pixels and phase detection pixels in a single image sensor. With this type of arrangement, a camera can use the on-chip phase detection pixels to focus an image without requiring a separate phase detection sensor. However, in some cases the quality of the phase detection data gathered by on-chip phase detection pixels can be negatively affected by both the physical arrangement of the phase detection pixels and characteristics of the targeted scene such as illumination level.

It would therefore be desirable to be able to provide image sensors with improved methods of phase detection.

DETAILED DESCRIPTION

Embodiments of the present invention relate to image sensors with automatic focusing and depth sensing capabilities. In certain embodiments, an image sensor may have both image pixels and phase detection pixels in a single image sensor. The phase detection pixels may be used in the automatic focusing and depth sensing capabilities. Phase detection pixels may be arranged in the image sensor in a variety of ways. For example, the phase detection pixels may be randomly scattered throughout the array of image pixels. Alternatively, the phase detection pixels may be arranged in a repeatable pattern. In some cases the pattern may include one or more vertical or horizontal lines of consecutively arranged phase detection pixels. The lines may be separated by other image pixels or the lines may be adjacent. Phase detection pixels may also be arranged in vertical or horizontal dashed lines.

In order to perform automatic focusing, an imaging system may use more than one of the phase detection pixels in the pixel array. For example, a group of phase detection pixels, sometimes referred to as a focus zone, may provide phase detection data. In some cases, another focus zone containing a different group of phase detection pixels may also provide phase detection data. In certain embodiments, the size and shape of the focus zones may be dynamically selected by the imaging system. One example in which this arrangement is advantageous is when the scene the imaging sensor is capturing has low illumination levels. Low illumination leads to more uncertainty in the phase detection pixel data. The imaging system may therefore use more phase detection pixels in each focus zone to ensure reliable phase detection data.

Figure 1:
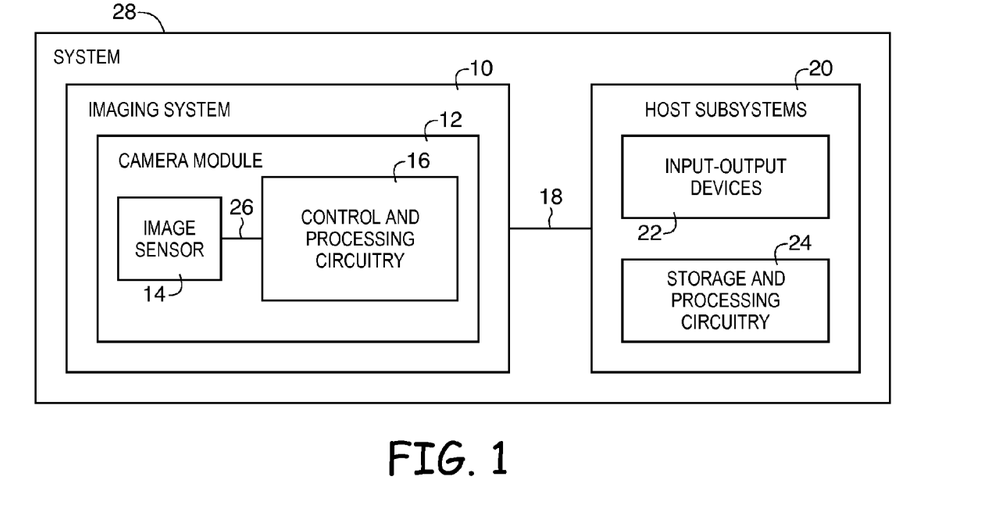
FIG. 1 is a schematic diagram of an illustrative electronic device with an image sensor that may include phase detection pixels in accordance with an embodiment of the present invention.

FIG. 1 is a diagram of an illustrative system having an imaging system that uses an image sensor to capture images and a corresponding host subsystem. System 28 of FIG. 1 may, for example, be an electronic device such as a camera, a cellular telephone, a video camera, or other electronic device that captures digital image data.

As shown in FIG. 1, system 28 may include an imaging system such as imaging system 10 and host subsystems such as host subsystem 20. Imaging system 10 may include camera module 12. Camera module 12 may include one or more image sensors 14 and one or more corresponding lenses. The lenses in camera module 12 may, as an example, include M*N individual lenses arranged in an M×N array. Individual image sensors 14 may be arranged in a corresponding M×N image sensor array (as an example). The values of M and N may each be equal to or greater than one, may each be equal to or greater than two, may exceed 10, or may have any other suitable values.

Each image sensor in camera module 12 may be identical or there may be different types of image sensors in a given image sensor array integrated circuit. Each image sensor may be a Video Graphics Array (VGA) sensor with a resolution of 480×640 image sensor pixels (as an example). Other arrangements of image sensor pixels may also be used for the image sensors if desired. For example, images sensors with greater than VGA resolution (e.g., high-definition image sensors), less than VGA resolution and/or image sensor arrays in which the image sensors are not all identical may be used.

During image capture operations, each lens may focus light onto an associated image sensor 14. Image sensor 14 may include photosensitive elements (i.e., pixels) that convert the light into digital data. Image sensors may have any number of pixels (e.g., hundreds, thousands, millions, or more). A typical image sensor may, for example, have millions of pixels (e.g., megapixels). As examples, image sensor 14 may include bias circuitry (e.g., source follower load circuits), sample and hold circuitry, correlated double sampling (CDS) circuitry, amplifier circuitry, analog-to-digital (ADC) converter circuitry, data output circuitry, memory (e.g., buffer circuitry), address circuitry, etc.

Still and video image data from image sensor 14 may be provided to control and processing circuitry 16 via path 26. Control and processing circuitry 16 may be used to perform image processing functions such as automatic focusing functions, depth sensing, data formatting, adjusting white balance and exposure, implementing video image stabilization, face detection, etc. For example, during automatic focusing operations, image processing and data formatting circuitry 16 may process data gathered by phase detection pixels in image sensor 14 to determine the magnitude and direction of lens movement needed to bring an object of interest into focus.

Control and processing circuitry 16 may also be used to compress raw camera image files if desired (e.g., to Joint Photographic Experts Group or JPEG format). In a typical arrangement, which is sometimes referred to as a system on chip (SOC) arrangement, camera sensor 14 and control and processing circuitry 16 are implemented on a common semiconductor substrate (e.g., a common silicon image sensor integrated circuit die). If desired, camera sensor 14 and processing circuitry 16 may be formed on separate semiconductor substrates. For example, camera sensor 14 and processing circuitry 16 may be formed on separate substrates that have been stacked.

Imaging system 10 may convey acquired image data to host subsystem 20 over path 18. Host subsystem 20 may include processing software for detecting objects in images, detecting motion of objects between image frames, determining distances to objects in images, filtering or otherwise processing images provided by imaging system 10.

If desired, system 28 may provide a user with numerous high-level functions. In a computer or advanced cellular telephone, for example, a user may be provided with the ability to run user applications. To implement these functions, host subsystem 20 of system 28 may have input-output devices 22 such as keypads, input-output ports, joysticks, and displays and storage and processing circuitry 24. Storage and processing circuitry 24 may include volatile and nonvolatile memory (e.g., random-access memory, flash memory, hard drives, solid state drives, etc.). Storage and processing circuitry 24 may also include microprocessors, microcontrollers, digital signal processors, application specific integrated circuits, etc.

It may be desirable to provide image sensors with depth sensing capabilities (e.g., to use in automatic focusing applications, 3D imaging applications such as machine vision applications, etc.). To provide depth sensing capabilities, image sensor 14 may include phase detection pixel groups such as pixel pair 100 shown in FIG. 2A.

Figure 2A:
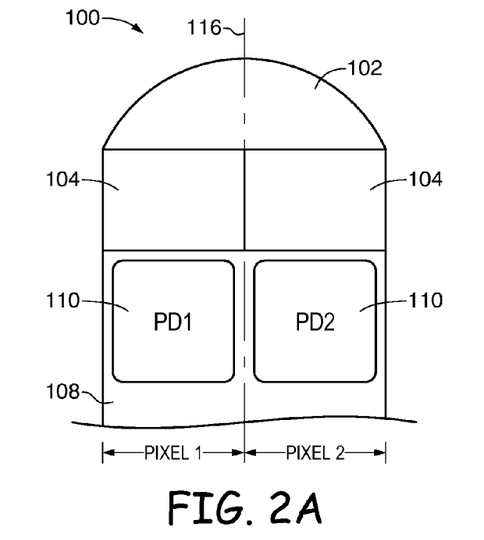
FIG. 2A is a cross-sectional view of illustrative phase detection pixels having photosensitive regions with different and asymmetric angular responses in accordance with an embodiment of the present invention.

FIG. 2A is an illustrative cross-sectional view of pixel pair 100. Pixel pair 100 may include first and second pixels such as Pixel 1 and Pixel 2. Pixel 1 and Pixel 2 may include photosensitive regions 110 formed in a substrate such as silicon substrate 108. For example, Pixel 1 may include an associated photosensitive region such as photodiode PD1, and Pixel 2 may include an associated photosensitive region such as photodiode PD2. A microlens may be formed over photodiodes PD1 and PD2 and may be used to direct incident light towards photodiodes PD1 and PD2. The arrangement of FIG. 2A in which microlens 102 covers two pixel regions may sometimes be referred to as a 2×1 or 1×2 arrangement because there are two phase detection pixels arranged consecutively in a line. Microlens 102 may have a width and a length, with the length being longer than the width. Microlens 102 may have a length that is about twice as long as its width. Microlens 102 may be in the shape of an ellipse with an aspect ratio of about 2:1. In other embodiments, microlens 102 may be another shape such as a rectangle or another desired shape. Microlens 102 may have an aspect ratio of less than 2:1, 2:1, greater than 2:1, greater than 3:1, or any other desired aspect ratio.

Color filters such as color filter elements 104 may be interposed between microlens 102 and substrate 108. Color filter elements 104 may filter incident light by only allowing predetermined wavelengths to pass through color filter elements 104 (e.g., color filter 104 may only be transparent to the certain ranges of wavelengths). Photodiodes PD1 and PD2 may serve to absorb incident light focused by microlens 102 and produce pixel signals that correspond to the amount of incident light absorbed.

Photodiodes PD1 and PD2 may each cover approximately half of the substrate area under microlens 102 (as an example). By only covering half of the substrate area, each photosensitive region may be provided with an asymmetric angular response (e.g., photodiode PD1 may produce different image signals based on the angle at which incident light reaches pixel pair 100). The angle at which incident light reaches pixel pair 100 relative to a normal axis 116 (i.e., the angle at which incident light strikes microlens 102 relative to the optical axis 116 of lens 102) may be herein referred to as the incident angle or angle of incidence.

An image sensor can be formed using front side illumination imager arrangements (e.g., when circuitry such as metal interconnect circuitry is interposed between the microlens and photosensitive regions) or back side illumination imager arrangements (e.g., when photosensitive regions are interposed between the microlens and the metal interconnect circuitry). The example of FIGS. 2A, 2B, and 2C in which pixels 1 and 2 are backside illuminated image sensor pixels is merely illustrative. If desired, pixels 1 and 2 may be front side illuminated image sensor pixels. Arrangements in which pixels are backside illuminated image sensor pixels are sometimes described herein as an example.

Figure 2B:
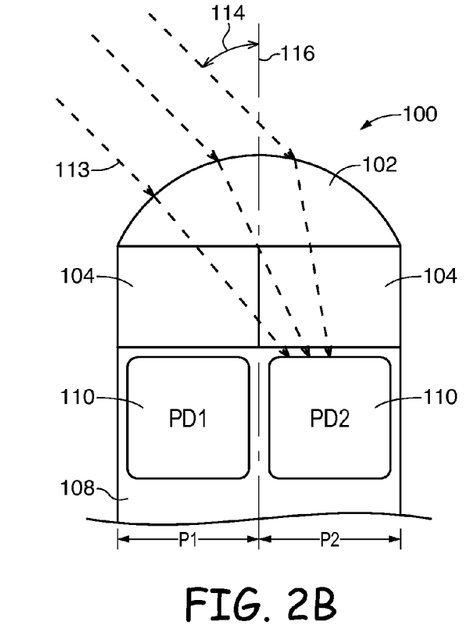
FIGS. 2B and 2C are cross-sectional views of the phase detection pixels of FIG. 2A in accordance with an embodiment of the present invention.

In the example of FIG. 2B, incident light 113 may originate from the left of normal axis 116 and may reach pixel pair 100 with an angle 114 relative to normal axis 116. Angle 114 may be a negative angle of incident light. Incident light 113 that reaches microlens 102 at a negative angle such as angle 114 may be focused towards photodiode PD2. In this scenario, photodiode PD2 may produce relatively high image signals, whereas photodiode PD1 may produce relatively low image signals (e.g., because incident light 113 is not focused towards photodiode PD1).

Figure 2C:
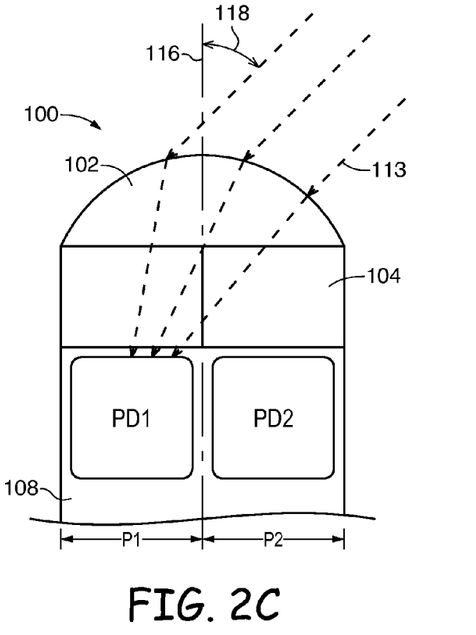

In the example of FIG. 2C, incident light 113 may originate from the right of normal axis 116 and reach pixel pair 100 with an angle 118 relative to normal axis 116. Angle 118 may be a positive angle of incident light. Incident light that reaches microlens 102 at a positive angle such as angle 118 may be focused towards photodiode PD1 (e.g., the light is not focused towards photodiode PD2). In this scenario, photodiode PD2 may produce an image signal output that is relatively low, whereas photodiode PD1 may produce an image signal output that is relatively high.

In the embodiments of FIGS. 2A-2C, the pixels for gathering phase detection information are depicted as phase detection pixel pairs with two photodiodes covered by a single microlens. However, this example is purely illustrative. Any desired pixel arrangement may be used for gathering phase detection information. For example, non-adjacent pixels or pixels with metal apertures may be used to gather phase detection data.

Figure 3:
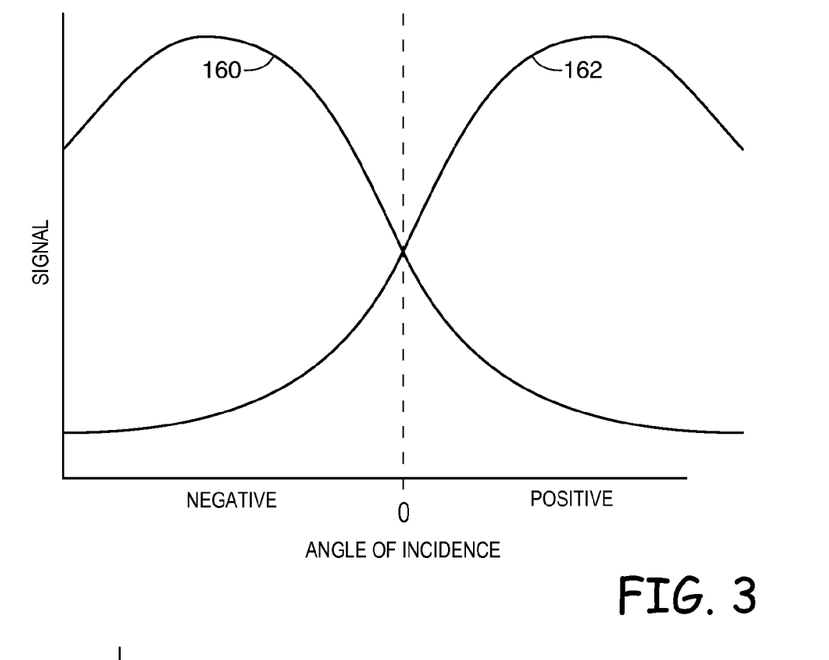
FIG. 3 is a diagram of illustrative signal outputs of phase detection pixels for incident light striking the phase detection pixels at varying angles of incidence in accordance with an embodiment of the present invention.

The positions of photodiodes PD1 and PD2 may sometimes be referred to as asymmetric positions because the center of each photosensitive area 110 is offset from (i.e., not aligned with) optical axis 116 of microlens 102. Due to the asymmetric formation of individual photodiodes PD1 and PD2 in substrate 108, each photosensitive area 110 may have an asymmetric angular response (e.g., the signal output produced by each photodiode 110 in response to incident light with a given intensity may vary based on an angle of incidence). In the diagram of FIG. 3, an example of the pixel signal outputs of photodiodes PD1 and PD2 of pixel pair 100 in response to varying angles of incident light is shown.

Line 160 may represent the output image signal for photodiode PD2 whereas line 162 may represent the output image signal for photodiode PD1. For negative angles of incidence, the output image signal for photodiode PD2 may increase (e.g., because incident light is focused onto photodiode PD2) and the output image signal for photodiode PD1 may decrease (e.g., because incident light is focused away from photodiode PD1). For positive angles of incidence, the output image signal for photodiode PD2 may be relatively small and the output image signal for photodiode PD1 may be relatively large.

The size and location of photodiodes PD1 and PD2 of pixel pair 100 of FIGS. 2A, 2B, and 2C are merely illustrative. If desired, the edges of photodiodes PD1 and PD2 may be located at the center of pixel pair 100 or may be shifted slightly away from the center of pixel pair 100 in any direction. If desired, photodiodes 110 may be decreased in size to cover less than half of the pixel area.

Output signals from pixel pairs such as pixel pair 100 may be used to adjust the optics (e.g., one or more lenses such as lenses 28 of FIG. 1) in camera module 12 during automatic focusing operations. The direction and magnitude of lens movement needed to bring an object of interest into focus may be determined based on the output signals from pixel pairs 100.

For example, by creating pairs of pixels that are sensitive to light from one side of the lens or the other, a phase difference can be determined. This phase difference may be used to determine both how far and in which direction the image sensor optics should be adjusted to bring the object of interest into focus.

When an object is in focus, light from both sides of the image sensor optics converges to create a focused image. When an object is out of focus, the images projected by two sides of the optics do not overlap because they are out of phase with one another. By creating pairs of pixels where each pixel is sensitive to light from one side of the lens or the other, a phase difference can be determined. This phase difference can be used to determine the direction and magnitude of optics movement needed to bring the images into phase and thereby focus the object of interest. Pixel groups that are used to determine phase difference information such as pixel pair 100 are sometimes referred to herein as phase detection pixels or depth-sensing pixels.

A phase difference signal may be calculated by comparing the output pixel signal of PD1 with that of PD2. For example, a phase difference signal for pixel pair 100 may be determined by subtracting the pixel signal output of PD1 from the pixel signal output of PD2 (e.g., by subtracting line 162 from line 160). For an object at a distance that is less than the focused object distance, the phase difference signal may be negative. For an object at a distance that is greater than the focused object distance, the phase difference signal may be positive. This information may be used to automatically adjust the image sensor optics to bring the object of interest into focus (e.g., by bringing the pixel signals into phase with one another).

The phase difference signal for pixel pair 100 may have an uncertainty associated with the signal. The uncertainty associated with the phase difference signal is sometimes referred to as noise. In order to quantify how much of an affect the noise has on the phase difference signal, the signal to noise ratio of the phase different signal may be examined. Signal to noise ratio is a ratio of the strength of a signal to the uncertainty of the signal. A high signal to noise ratio indicates that the signal strength is much greater than the noise. The measured signal strength therefore has a high certainty. A low signal to noise ratio indicates that the signal strength is not much greater than the noise. The measured signal strength therefore has a low certainty.

Figure 4:
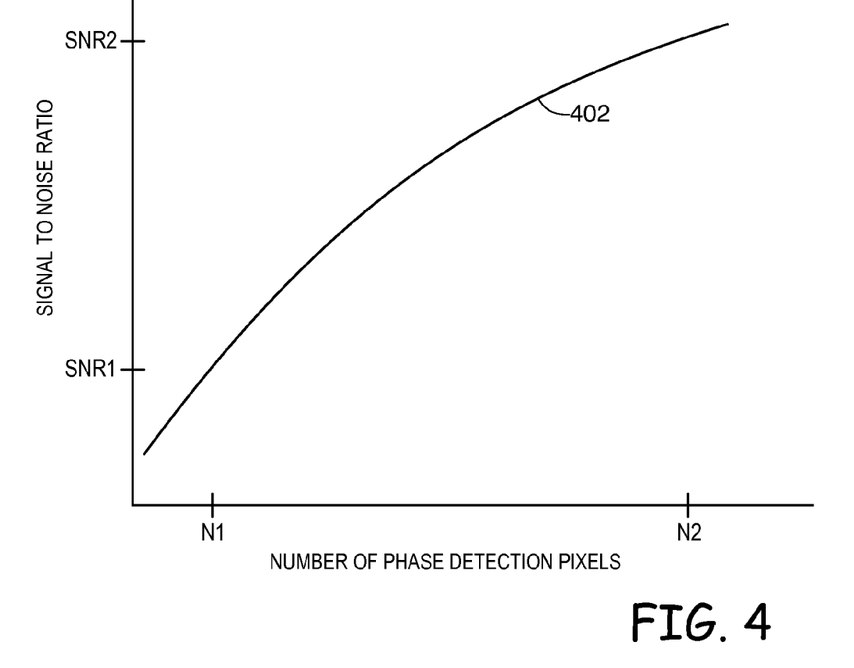
FIG. 4 is a diagram of illustrative signal to noise ratios for zones of phase detection pixel pairs compared to the number of phase detection pixel pairs in the zones in accordance with an embodiment of the present invention.

FIG. 4 shows how the signal to noise ratio of the phase difference signal compares to the number of phase detection pixels used to generate the signal. Line 402 may represent the signal to noise ratio of a given number of phase detection pixels. In general, there is a trend that the signal to noise ratio increases as more phase detection pixels are used to generate the signal. Line 402 is purely illustrative, and the change of signal to noise ratio compared to the number of phase detection pixel pairs used may follow any trend. In one illustrative example, N1 may correspond to approximately 100 phase detection pixel pairs. The signal to noise ratio SNR1 associated with 100 phase detection pixel pairs may be approximately 39. As the number of phase detection pixels increases from N1 to N2, the signal to noise ratio may increase from SNR1 to SNR2. In this example, N2 may correspond to approximately 400 phase detection pixel pairs. The signal to noise ratio SNR2 associated with 400 phase detection pixel pairs may be approximately 45. In this example, SNR2 is higher than SNR1, therefore the phase difference signal from N2 has less noise than the phase difference signal from N1. Using more phase detection pixels (e.g., N2 instead of N1) would therefore produce more reliable phase detection data. This example is purely illustrative, and N1, N2, SNR1, and SNR2 may correspond to values such as values less than 1, equal to 1, greater than 1, greater than 10, greater than 100, greater than 1000, or any other suitable values.

Figure 5:
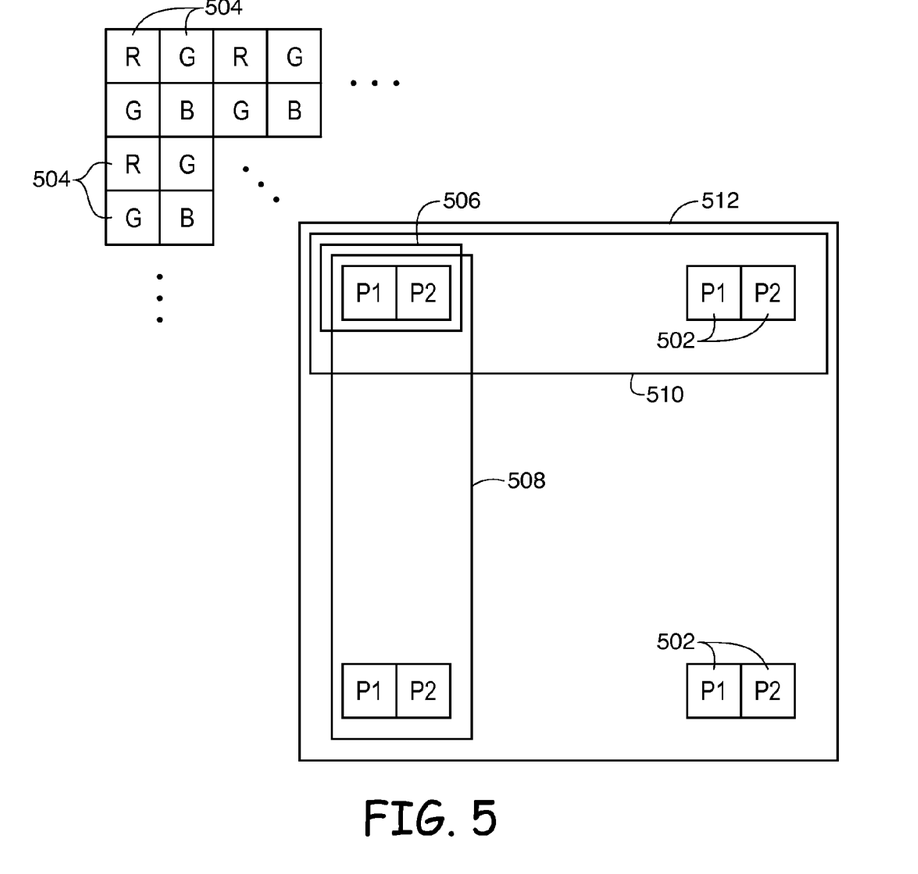
FIG. 5 is a top view of an illustrative pixel array having scattered phase detection pixel pairs with dynamic focus zones in accordance with an embodiment of the present invention.

FIG. 5 is a top view of an illustrative pixel array having scattered phase detection pixel pairs with dynamic focus zones. The pixel array may include an array of image pixels 504. Phase detection pixels 502 may be scattered throughout the array of image pixels. In certain embodiments, the phase detection pixels may be arranged in pairs such as phase detection pixel pair 100, with a first phase detection pixel P1 next to a second phase detection pixel P2. The pixel array may include a color filter array. Pixels marked with an R include a red color filter, pixels marked with a G include a green color filter, and pixels marked with a B include a blue color filter. The pattern of color filters in image pixels 504 is a Bayer mosaic pattern which includes a repeating unit cell of two-by-two image pixels 504 having two green image pixels arranged on one diagonal and one red and one blue image pixel arranged on the other diagonal. The phase detection pixels may have a color filter element that matches the color filter pattern of image pixels 504. Alternatively, phase detection pixels 502 may have a color filter element that does not match the color filter pattern of image pixels 504.

Phase detection pixels 502 may be arranged in the pixel array in any desired manner. FIG. 5 shows phase detection pixels arranged in pairs that are scattered throughout the array. However, this example is purely illustrative. The phase detection pixels may be scattered in a random or non-random pattern. The phase detection pixels may be arranged in scattered pairs, scattered groups of four, scattered groups of more than four, or any other desired arrangement. The phase detection pixels may be arranged in pairs as shown in FIGS. 2A-2C. Alternatively, the phase detection pixels may be non-adjacent. In general, the phase detection pixels may include any photosensitive areas that can be used to obtain phase detection information.

FIG. 5 shows illustrative focus zones that may be dynamically chosen by the imaging system. Four exemplary focus zones are shown in FIG. 5. Focus zone 506 includes only a single pair of phase detection pixels. Focus zone 508 includes two pairs of phase detection pixels that are in the same column. Focus zone 510 includes two pairs of phase detection pixels that are in the same row. Focus zone 512 includes four phase detection pixel pairs. These examples of possible focus zones are purely illustrative. Focus zones 506, 508, 510, and 512 may include one pixel pair, two pixel pairs, more than two pixel pairs, more than ten pixel pairs, more than one hundred pixel pairs, more than one thousand pixel pairs, or any other desired number of pixel pairs. Phase detection pixel pairs in focus zone 508 need not be in the same column. Similarly, phase detection pixel pairs in focus zone 510 need not be in the same row. The above examples of focus zones are purely illustrative. In general, each focus zone may include any phase detection pixel in the pixel array.

The phase detection pixel pairs of FIG. 5 are all oriented horizontally. This example is purely illustrative, as the pixel array may include only horizontally oriented phase detection pixel pairs, only vertically oriented phase detection pairs, or a combination of horizontally and vertically oriented phase detection pixel pair. Each focus zone may include only horizontally oriented phase detection pixel pairs, only vertically oriented phase detection pairs, or a combination of horizontally and vertically oriented phase detection pixel pair.

FIG. 5 shows only four focus zones in the pixel array. This example is purely illustrative. The pixel array may include one focus zone, two focus zones, more than two focus zones, more than four focus zones, more than ten focus zones, more than one hundred focus zones, or any other desired number of focus zones. FIG. 5 also illustrates overlapping focus zones. This example is purely illustrative. The pixel array may include focus zones that all overlap the same phase detection pixel. Alternatively, the pixel array may include focus zones that never overlap the same phase detection pixel. The pixel array may also include some overlapping focus zones and some non-overlapping focus zones.

Figure 6:
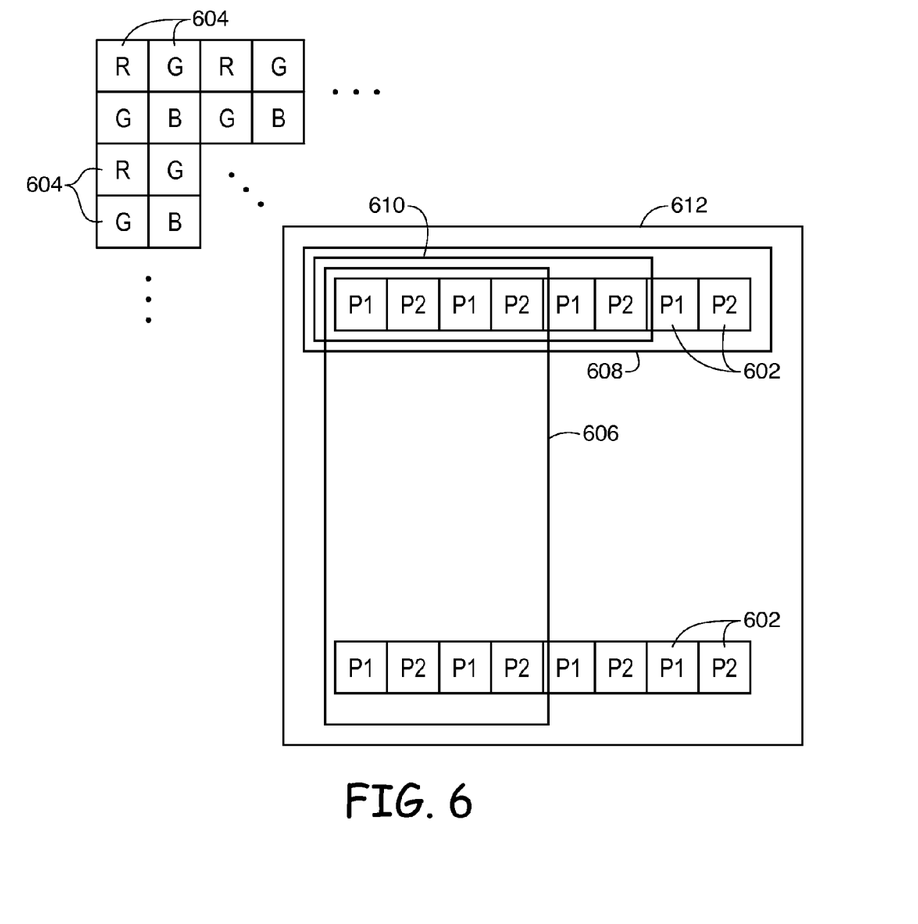
FIG. 6 is a top view of an illustrative pixel array having lines of phase detection pixel pairs with dynamic focus zones in accordance with an embodiment of the present invention.

In certain embodiments, the phase detection pixels may be arranged in lines as shown in FIG. 6. Phase detection pixels 602 are arranged consecutively in lines. FIG. 6 shows phase detection pixels 602 arranged in solid lines, but this example is purely illustrative. Phase detection pixels 602 may, for example, be arranged in dashed lines with one or more image pixel interposed between each phase detection pixel pair. The phase detection pixels may be arranged in one line, more than one line, more than two lines, more than five lines, more than ten lines, more than one hundred lines, or any other desired number of lines. The lines of phase detection pixels may extend completely across the pixel array. Alternatively, the lines of phase detection pixels may extend only partially across the pixel array. FIG. 6 shows the lines of phase detection pixels as having four phase detection pixel pairs. However, this example is purely illustrative. The lines may include two phase detection pixel pairs, more than two phase detection pixel pairs, more than ten phase detection pixel pairs, more than one hundred phase detection pixel pairs, more than four hundred phase detection pixel pairs, or any other desired number of phased detection pixel pairs. In general, the phase detection pixels may be arranged in any desired location in the pixel array.

FIG. 6 shows illustrative focus zones that may be dynamically chosen by the imaging system. Four exemplary focus zones are shown in FIG. 6. Focus zone 606 includes two partial rows of phase detection pixels. Focus zone 608 includes an entire row of phase detection pixels. Focus zone 610 includes a partial row of phase detection pixels. Focus zone 612 includes two entire rows of phase detection pixels. These examples of possible focus zones are purely illustrative. Focus zones 606, 608, 610, and 612 may include one pixel pair, two pixel pairs, more than two pixel pairs, more than ten pixel pairs, more than one hundred pixel pairs, more than one thousand pixel pairs, or any other desired number of pixel pairs. Focus zone 606 need not include phase detection pixel pairs from the same columns. Focus zone 606 may include phase detection pixel pairs from any portion of any row of phase detection pixels. The portions may be in any combination of columns. In general, each focus zone may include any phase detection pixel in the pixel array.

The phase detection pixel pairs of FIG. 6 are all oriented horizontally. This example is purely illustrative, as the pixel array may include only horizontally oriented phase detection pixel pairs, only vertically oriented phase detection pairs, or a combination of horizontally and vertically oriented phase detection pixel pair. Each focus zone may include only horizontally oriented phase detection pixel pairs, only vertically oriented phase detection pairs, or a combination of horizontally and vertically oriented phase detection pixel pair.

FIG. 6 shows only four focus zones in the pixel array. This example is purely illustrative. The pixel array may include one focus zone, two focus zones, more than two focus zones, more than four focus zones, more than ten focus zones, more than one hundred focus zones, or any other desired number of focus zones. FIG. 6 also illustrates overlapping focus zones. This example is purely illustrative. The pixel array may include focus zones that all overlap the same phase detection pixel. Alternatively, the pixel array may include focus zones that never overlap the same phase detection pixel. The pixel array may also include some overlapping focus zones and some non-overlapping focus zones.

Figure 7:
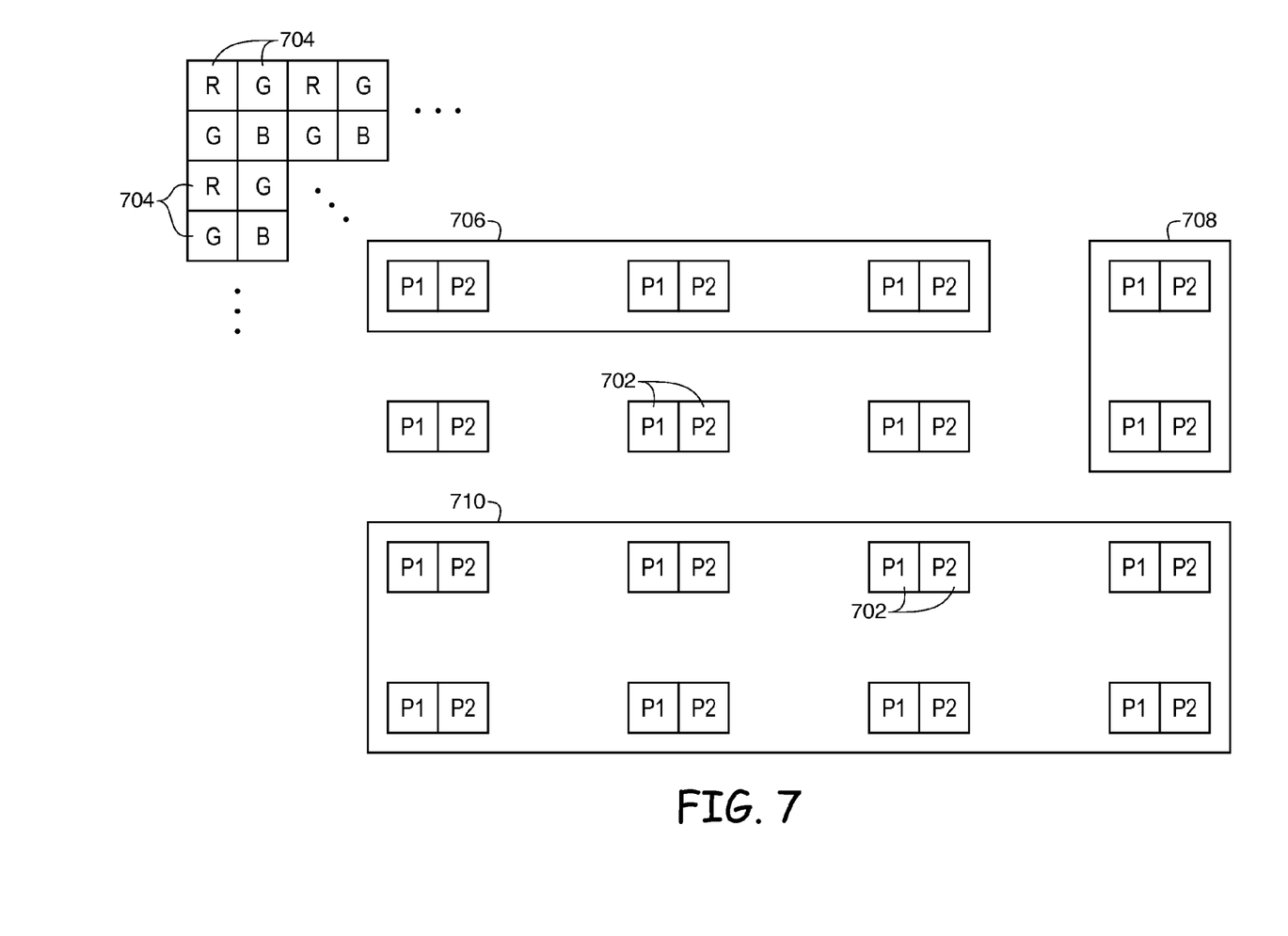
FIG. 7 is a top view of an illustrative pixel array having scattered phase detection pixel pairs with dynamic focus zones in accordance with an embodiment of the present invention.

FIG. 7 is another example of focus zones in a pixel array with scattered phase detection pixels. However, non-overlapping focus zones are shown. Three exemplary focus zones are shown in FIG. 7. Focus zone 706 includes three pairs of phase detection pixels. Focus zone 708 includes two pairs of phase detection pixel. Focus zone 710 includes eight pairs of phase detection pixels. These examples of possible focus zones are purely illustrative. Focus zones 706, 708, and 710 may include one pixel pair, two pixel pairs, more than two pixel pairs, more than ten pixel pairs, more than one hundred pixel pairs, more than one thousand pixel pairs, or any other desired number of pixel pairs. Focus zone 706 need not include phase detection pixel pairs from only the same row. Focus zone 706 may include phase detection pixel pairs from any portion of any row of phase detection pixels. Similarly, focus zone 708 need not include phase detection pixel pairs from only the same column. Focus zone 708 may include phase detection pixel pairs from any portion of any column of phase detection pixels. In general, each focus zone may include any phase detection pixel in the pixel array.

Figure 8:
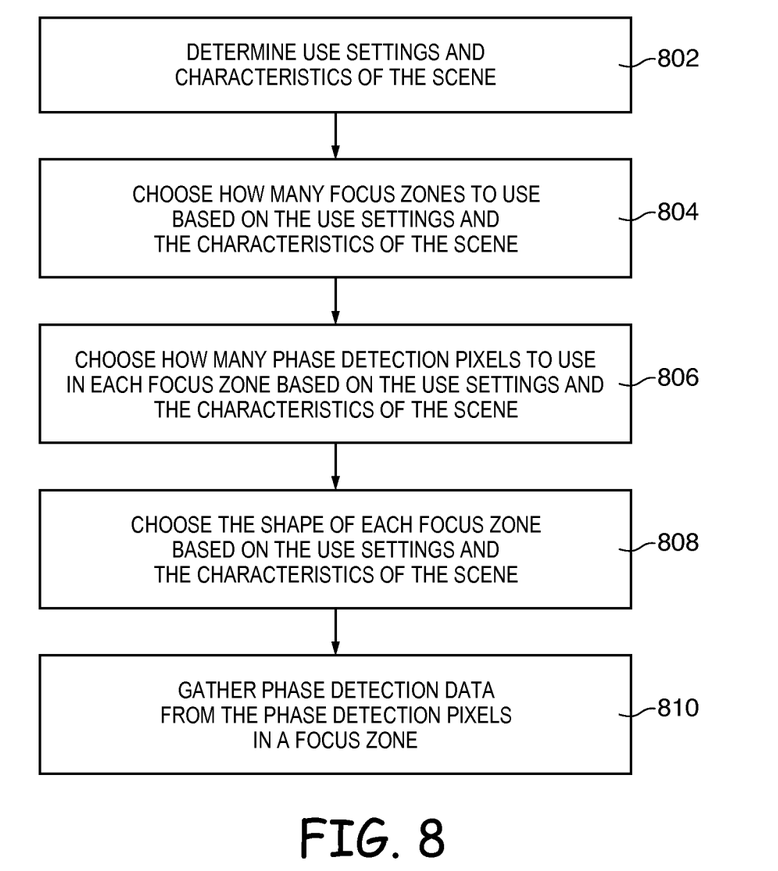
FIG. 8 is a flowchart of illustrative steps that may be performed by an imaging system to dynamically select focus zones in accordance with an embodiment of the present invention.

FIG. 8 is a flowchart of illustrative steps that may be performed by an imaging system to dynamically select focus zones. At step 802, imaging system 10 may use control and processing circuitry 16 to determine use settings and characteristics of the scene. Possible use settings that could be taken into account are shutter speed, aperture size, and exposure time. These settings may be associated with various automatic modes used by the imaging system. For example, control and processing circuitry 16 may determine that the imaging system is in a landscape mode, portrait mode, or action mode. The automatic modes may have a predetermined shutter speed, aperture size, and exposure time. Relevant characteristics of the scene may include the illumination level, the number of subjects in the scene, or the position and orientation of edges in the scene.

At step 804, control and processing circuitry 16 may choose how many focus zones to use based on the use settings and the characteristics of the scene determined in step 802. At step 806, control and processing circuitry 16 may choose how many phase detection pixels to include in each focus zone based on the use settings and the characteristics of the scene determined in step 802. At step 808, control and processing circuitry may choose the shape of each focus zone based on the use settings and the characteristics of the scene. The order of steps 804, 806, and 808 as shown in FIG. 8 is purely illustrative. These steps may occur in any desired order. For example, step 804 may happen first, step 806 may happen first, or step 808 may happen first. Similarly, step 804 may happen last, step 806 may happen last, or step 808 may happen last.

At step 806, control and processing circuitry may, for example, determine that the target scene has a low illumination level. In these cases, each focus zone may have more phase detection pixels to ensure accurate phase detection data. Alternatively, control and processing circuitry may determine that the target scene has a high illumination level. Each focus zone would then have fewer phase detection pixels due to the improved quality of the data from each pixel.

In another illustrative example, control and processing circuitry 16 may determine that the scene includes a number of vertical edges at step 802. Horizontally oriented phase detection pixel pairs may be better suited to detect vertical edges in the scene. Upon detection of vertical edges in the scene, control and processing circuitry 16 may select focus zones that include horizontally oriented phase detection pixel pairs. Alternatively, control and processing circuitry 16 may determine that the scene includes a number of horizontal edges. In these cases, control and processing circuitry 16 may select focus zones that include vertically oriented phase detection pixel pairs at step 808.

By selecting how many focus zones, how many phase detection pixels to use in each focus zone, and the shape of each focus zone, control and processing circuitry 16 may optimize the focus zones to generate the best possible phase detection data.

At step 810, phase detection data may be gathered from the phase detection pixels in a focus zone. Data may be gathered from one focus zone, a portion of the focus zones, or every focus zone. This data may then be used to perform automatic focusing operations. By dynamically selecting the focus zones, the imaging system may be able to focus the image pixels faster than if the same focus zones were always used. This increased time to focus may improve operations of imaging system 10 and system 28.

Various embodiments have been described illustrating an image sensor with dynamic focus zones. In various embodiments of the invention, an image sensor may have a pixel array with a plurality of image pixels and a plurality of phase detection pixels. Image sensor may be operated by determining a characteristic of a scene. Based at least on the characteristic of the scene, a plurality of phase detection pixels may be grouped into a focus zone. The portion of phase detection pixels in the focus zone may then gather phase detection data.

Grouping the portion of the plurality of phase detection pixels into the focus zone may include selecting how many phase detection pixels to be used in the focus zone as well as selecting the shape of the focus zone. Determining the characteristic of the scene may include determining an illumination level of the scene. Determining the characteristic of the scene may also include determining the scene has a horizontal or vertical edge. The plurality of phase detection pixels may be arranged in pairs that include first and second phase detection pixels with different angular responses. The pairs of phase detection pixels may be randomly distributed throughout the pixel array. The pairs of phase detection pixels may also be arranged in lines, either continuous or dashed. Grouping the portion of the plurality of phase detection pixels into the focus zone may be based at least on the characteristic of the scene and a use setting of the image sensor.

In various embodiments of the invention, an image sensor may include an array of image pixels with phase detection pixels distributed throughout the array. The image sensor may be operated by dynamically grouping the phase detection pixels into a plurality of focus zones. Phase detection data may then be gathered from the phase detection pixels in at least one focus zone of the plurality of focus zones. Dynamically grouping the phase detection pixels into the plurality of focus zones may include selecting a number of focus zones to be formed, selecting how many phase detection pixels to use in each focus zone, or selecting the shape of each focus zone. The phase detection pixels may be grouped into focus zones based on a characteristic of the scene or a use setting of the image sensor. The focus zones may vary in size and shape.

In various embodiments of the invention, an image sensor includes a pixel array. The pixel array may include a plurality of image pixels that gather image data and a plurality of phase detection pixels that gather phase information. The phase detection pixels may be arranged in pairs that include first and second phase detection pixels with different angular responses. A single respective microlens may cover each pair of phase detection pixels. The image sensor may also include control and processing circuitry and a plurality of focus zones. The control and processing circuitry may be configured to dynamically select the plurality of focus zones.

The foregoing is merely illustrative of the principles of this invention and various modifications can be made by those skilled in the art without departing from the scope and spirit of the invention.

What is claimed is:

1. A method of operating an imaging system that includes an image sensor having a pixel array and control and processing circuitry, wherein the pixel array comprises a plurality of image pixels and a plurality of phase detection pixels and wherein there is a total number of phase detection pixels in the plurality of phase detection pixels, the method comprising:
   determining a use setting, wherein the use setting comprises a use setting selected from the group consisting of: shutter speed, aperture size, and exposure time;
   based at least on the use setting, grouping a portion of the plurality of phase detection pixels into a focus zone, wherein the portion of the plurality of phase detection pixels in the focus zone includes fewer phase detection pixels than the total number of phase detection pixels; and
   gathering phase detection data with the portion of phase detection pixels in the focus zone.

2. The method defined in claim 1, wherein grouping the portion of the plurality of phase detection pixels into the focus zone comprises selecting how many phase detection pixels to be used in the focus zone.

3. The method defined in claim 1, wherein the plurality of phase detection pixels is randomly distributed throughout the pixel array.

4. The method defined in claim 1, wherein the use setting comprises shutter speed, and wherein grouping the portion of the plurality of phase detection pixels into the focus zone comprises grouping the portion of the plurality of phase detection pixels into the focus zone based on the shutter speed.

5. The method defined in claim 1, wherein the use setting comprises aperture size, and wherein grouping the portion of the plurality of phase detection pixels into the focus zone comprises grouping the portion of the plurality of phase detection pixels into the focus zone based on the aperture size.

6. The method defined in claim 1, wherein the use setting comprises exposure time, and wherein grouping the portion of the plurality of phase detection pixels into the focus zone comprises grouping the portion of the plurality of phase detection pixels into the focus zone based on the exposure time.

7. The method defined in claim 1, wherein the plurality of phase detection pixels includes a plurality of horizontally oriented phase detection pixel pairs and a plurality of vertically oriented phase detection pixel pairs, the method further comprising:
   determining a characteristic of a scene, wherein determining the characteristic of the scene comprises identifying an edge in the scene selected from the group consisting of: a horizontal edge and a vertical edge, wherein grouping the portion of the plurality of phase detection pixels into the focus zone comprises grouping the portion of the plurality of phase detection pixels into the focus zone based at least on the characteristic, wherein phase detection pixel pairs of the plurality of horizontally oriented phase detection pixel pairs are included in the focus zone if the vertical edge is identified in the scene, and wherein phase detection pixel pairs of the plurality of vertically oriented phase detection pixel pairs are included in the focus zone if the horizontal edge is identified in the scene.

8. The method defined in claim 2, wherein grouping the portion of the plurality of phase detection pixels into the focus zone further comprises selecting the shape of the focus zone.

9. An imaging system comprising:
   an image sensor with a pixel array, wherein the pixel array comprises:
      a plurality of image pixels that gather image data, wherein each image pixel of the plurality of image pixels comprises a microlens that covers a single photodiode; and
      a plurality of phase detection pixels that gather phase information, wherein the phase detection pixels are arranged in a plurality of horizontally oriented pairs that each include first and second phase detection pixels with different angular responses and a plurality of vertically oriented pairs that each include first and second phase detection pixels with different angular responses; and
   control and processing circuitry, wherein the control and processing circuitry is configured to dynamically select a plurality of focus zones based on a shutter speed, wherein each focus zone comprises a respective plurality of phase detection pixels.

10. The imaging system defined in claim 9, wherein the plurality of focus zones vary in size and shape.

11. The imaging system defined in claim 9, wherein at least two focus zones of the plurality of focus zones overlap.

12. An imaging system comprising:
   an image sensor with a pixel array, wherein the pixel array comprises:
      a plurality of image pixels that gather image data, wherein each image pixel of the plurality of image pixels comprises a microlens that covers a single photodiode; and
      a plurality of phase detection pixels that gather phase information, wherein the phase detection pixels are arranged in a plurality of horizontally oriented pairs that each include first and second phase detection pixels with different angular responses and a plurality of vertically oriented pairs that each include first and second phase detection pixels with different angular responses; and
   control and processing circuitry, wherein the control and processing circuitry is configured to dynamically select a plurality of focus zones based on a shutter speed, wherein each focus zone comprises a respective plurality of phase detection pixels, and wherein each focus zone includes fewer phase detection pixels than a total number of phase detection pixels in the image sensor.

13. The imaging system defined in claim 12, wherein at least two focus zones of the plurality of focus zones overlap.

14. The imaging system defined in claim 12, wherein the plurality of focus zones includes at least a first focus zone and a second focus zone, wherein the first focus zone includes a first phase detection pixel and a second phase detection pixel, and wherein the second focus zone includes the first phase detection pixel and a third phase detection pixel.

15. The imaging system defined in claim 14, wherein the first focus zone does not include the third phase detection pixel and wherein the second focus zone does not include the second phase detection pixel.

\* \* \* \* \*